United States Patent

[11] 3,574,957

| | | |
|---|---|---|
| [72] | Inventor | Jack D. Bello-Bridick<br>820 South Lake St., Los Angeles, Calif. 90057 |
| [21] | Appl. No. | 779,020 |
| [22] | Filed | Nov. 26, 1968 |
| [45] | Patented | Apr. 13, 1971 |

[54] EDUCATIONAL TUMBLER
8 Claims, 7 Drawing Figs.

[52] U.S. Cl. .................................................. 35/76, 40/324
[51] Int. Cl. ................................................... G09b 1/24
[50] Field of Search .................................. 35/31.1, 35.7, 70 (Cursory), 75 (Cursory), 76, 77; 40/306, 310, 334, 335, 339, 324; 215/7, 100 (A); 206/(Indicia Digest)

[56] References Cited
UNITED STATES PATENTS

| 474,732 | 5/1892 | Gilmore | 35/76 |
|---|---|---|---|
| 564,885 | 7/1896 | Johnson | 40/335 |
| 566,761 | 9/1896 | Hosmer | 40/310 |
| 675,364 | 5/1901 | Burton | 215/7UX |
| 2,411,717 | 11/1946 | Fay et al. | 35/77 |
| 2,450,949 | 10/1948 | Gattuccio | 215/7UX |
| 2,533,569 | 12/1950 | Espinola | 35/31X |
| 2,687,581 | 8/1954 | Williams | 35/76X |
| 2,767,680 | 10/1956 | Lermer | 215/7X |
| 2,894,337 | 7/1959 | Rawlings | 35/75 |
| 3,407,514 | 10/1968 | Christian | 35/35 |

FOREIGN PATENTS

| 1,114,290 | 12/1955 | France | 40/335 |
|---|---|---|---|
| 276,383 | 7/1930 | Italy | 215/100 |

*Primary Examiner*—Harland S. Skogquist
*Attorney*—Roger A. Marrs

ABSTRACT: An educational or instructive tumbler is disclosed herein having a tubular, tapered sidewall integrally formed with a bottom at one end so as to hold fluid therein. A handle is carried on the external surface of the sidewall and is cantilevered therefrom to terminate in spaced-apart relationship with respect to the sidewall. Midway between the opposite ends of the tumbler, the sidewall is provided with a plurality of rotatable bands forming different levels. Each band carries indicia such as pictorial, alphabetic or numerical characters which, when properly placed in vertical alignment, represents a meaningful relationship.

Patented April 13, 1971 3,574,957
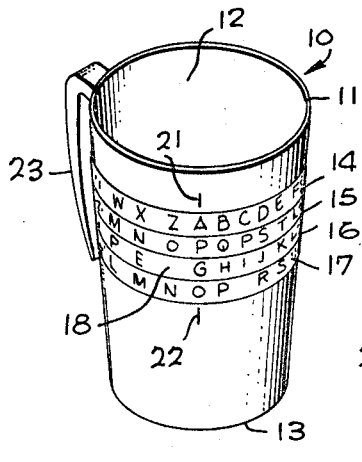
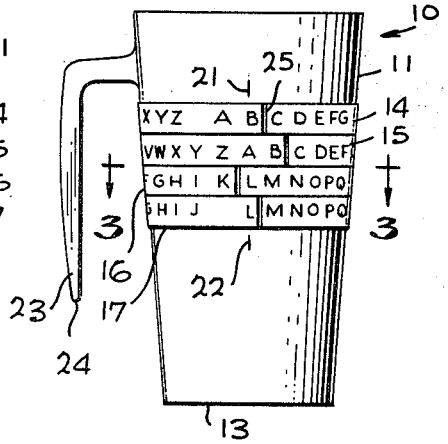
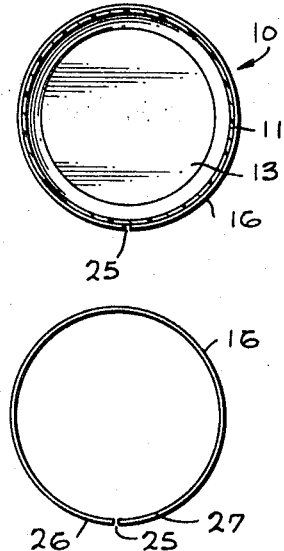
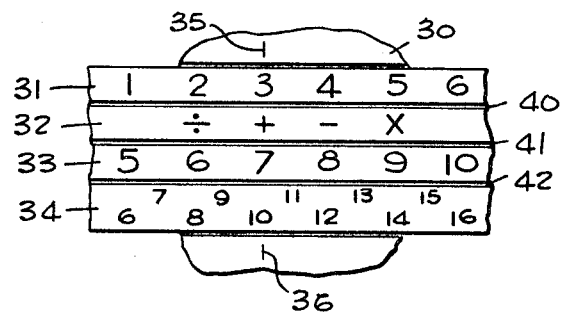
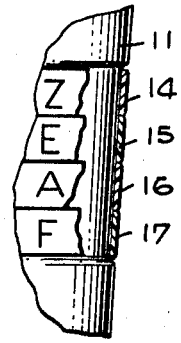
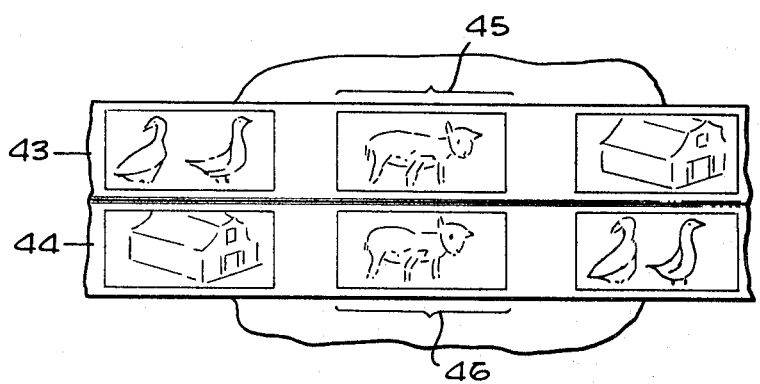
JACK D. BELLO-BRIDICK
INVENTOR.
BY Roger G. Marrs

EDUCATIONAL TUMBLER

BACKGROUND OF THE INVENTION

1. Field of the Invention

This invention relates to the field of educational or teaching aids and, more particularly, to a novel instructive drinking tumbler having movable character bearing bands adapted to be corelated with respect to one another to produce not only an interesting and amusing game, but which generates creative and instructive thinking on the part of the user.

2. Description of the Prior Art

In the past, it has been the conventional practice to employ educational aids in the form of character bearing cards, game pieces or the like which, when combined according to visual corelation of the characters, provides an instructive sequence or mental exercise for the user. However, problems and difficulties have been encountered with these conventional devices which stem largely from the fact that a multiplicity of pieces or parts are required and all of the characters are not displayed to the user at the time visual comparison takes place. Obviously, this is disadvantageous since separate parts of the set are easily lost and require substantial manual manipulation or support to coordinate all of the pieces.

Furthermore, the educational aids employed in the past are seldom useful for alternate applications such as items of tableware. It has been found that mealtime is one of relaxation for the participant and therefore, is a preferred time to engage in light or amusing educational activity. Prior educational aids seldom take advantage of the relaxation time of the participant, such as at meals, to increase the instructive value of the devices.

Additionally, most prior educational aids or devices do not lend themselves to nor are capable of permitting interchange of different character bearing members so that a variety of instructive categories may be employed. For example, prior art educational and teaching devices are related to alphabetical indicia, pictorial indicia or mathematical symbols. These devices are then limited in use or application to the instructive procedures associated with each of the symbols and no means are provided for interchange so that the instructive categories can be modified.

SUMMARY OF THE INVENTION

Accordingly, the problems and difficulties encountered with prior art educational and teaching devices are obviated by the present invention which provides a tumbler having a tapered, circular sidewall terminating at one end in an integral bottom while its opposite end is open for pouring or drinking a liquid therefrom. Midway between its opposite ends, the sidewall is provided with means for movably supporting a plurality of bands which are arranged adjacent to each other in parallel relationship so as to be movably displaced with respect to each other about the circular sidewall. Each of the bands is of a different diameter from its adjacent bands so as to accommodate the tapered form of the sidewall. Furthermore, each of the bands may be split and is composed of a resilient material so that the band may be expanded for detachable removal and assembly whereby the bands may be readily interchanged.

Each of the bands is provided with indicia representative of alphabetical, numerical, pictorial or instructive symbols so that as each of the bands are moved on the sidewall relative to one another, meaningful information is provided when selected ones of the symbols on each of the bands are vertically aligned. Indicator or marker means are provided on the sidewall to assist in vertical alignment of the combined band symbols.

A handle is provided for the tumbler which is cantilevered outwardly from the sidewall thereof and terminates at its free end in fixed spaced relationship with respect to the sidewall. By this means, the bands may be readily removed or attached to the sidewall of the tumbler without interference with the handle.

Therefore, it is among the primary objects of the present invention to provide a novel educational or teaching aid that not only provides means for corelating a plurality of indicia so as to provide meaningful information but may also be useful for functional applications, such as a cup, tumbler or the like.

Another object of the present invention is to provide an educational aid having a plurality of character bearing bands which are relatively interchangeable and movable with respect to each other so as to provide interesting and amusing entertainment when meaningfully aligned in adjacent relationship.

Still another object of the present invention is to provide a novel drinking tumbler having a plurality of bands carrying different indicia adapted to be moved relative to each other in order to place selected indicia on each band in vertical alignment to present meaningful information in an instructive and educational manner.

Yet another object of the present invention is to provide a novel educational aid taking the form of a tumbler having movable character bearing bands arranged in levels adapted to be moved relative to one another in order to align selected characters on each of the bands whereby the alignment of characters requires mental skill on the part of the user.

Another object of the present invention is to provide a novel drinking cup or tumbler having symbols or characters displayed thereon adapted to be moved relative to one another in order to provide an amusing and interesting game which involves mathematical computations of numerical characters and proper arrangement of alphabetical characters to spell words.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 1 is a perspective view of the novel educational tumbler of the present invention;

FIG. 2 is a side elevational view of the educational tumbler illustrating the rotational bands carrying alphabetic characters in vertical alignment between opposing markers;

FIG. 2A is an enlarged fragmentary view of the means for supporting the plurality of bands;

FIG. 3 is a transverse cross-sectional view as taken in the direction of arrows 3—3 of FIG. 2;

FIG. 4 is a top plan view of a band employed in the tumbler embodiment shown in FIGS. 1, 2 and 3;

FIG. 5 is an enlarged fragmentary view of the tumbler illustrating a plurality of bands carrying arithmetic symbols; and FIG. 6 is a fragmentary view of the tumbler showing bands marked with pictorial characters.

DESCRIPTION OF THE PREFERRED EMBODIMENTS

Referring to FIG. 1, the educational aid of the present invention is shown in the general direction of arrow 10 which comprises a drinking tumbler formed from a circular sidewall 11 having an open end 12 and a closed end 13 so that fluid may be contained therein and dispensed through the opening 12. Preferably, the sidewall 11 is tapered from its end formed with opening 12 to bottom 13. Midway between the opposite ends of the sidewall, there is provided a plurality of bands 14, 15, 16 and 17 which are rotatably carried in parallel relationship about the exterior surface of the sidewall 11. Each of the bands carries a plurality of separate indicia such as the alphabetical characters illustrated. Each character or symbol is spaced apart from adjacent characters or symbols and each level or band includes at least one blank space such as is indicated by numeral 18 on band 16.

The plurality of bands are rotatable with respect to each other on the sidewall so that selected characters or symbols carried on each of the bands may be arranged in vertical alignment between a pair of indicators or markers 21 and 22 carried on the exterior surface of sidewall 11 adjacent bands 14 and 17, respectively.

As shown in FIG. 2, the selected symbols or characters on each of the bands may be aligned to spell a word such as the word "ball" vertically aligned between the markers 21 and 22. When it is desired to spell a three letter word, the blank 18 on any one of the levels may be arranged between the markers 21 and 22 so that the three letters on the first three levels will spell a word or the letters on the bottom three levels may spell a word.

The bands 14—17 inclusive may be readily rotated by manual twisting of the bands with respect to the sidewall so that selected indicia is placed between the markers 21 and 22. It is to be noted that since the sidewall 11 tapers, the diameter of the respective bands vary accordingly so that the general contour is maintained and so that the respective bands may be supported thereon. Preferably, the area of the sidewall is formed with a circular recess, shown in FIG. 2A to accommodate the installation and support of the bands so that the top and bottom bands 14 and 17 will reside adjacent the edge of the recess while the bands 15 and 16 rest on top of a band located immediately below. In this fashion, all of the bands are adequately supported on the sidewall 11.

A handle 23 is secured to the external surface of the sidewall adjacent its end formed with opening 12 and which terminates in a cantilevered end 24 arranged in spaced apart relationship with respect to the sidewall 11. By this construction, the bands may be removed and slipped downwardly along the decreasing sidewall taper and over the bottom 13 for removal.

Referring now in detail to FIGS. 3 and 4, it can be seen that each of the bands may be formed with a slit 25 disrupting the circular continuity of the band. Preferably, each of the bands is composed of a resilient, plasticlike material so that the band may be expanded for removal from or assembly on the sidewall 11. The material of the band is sufficiently resilient so that its natural or normal configuration is circular, substantially as shown in FIG. 4. In this configuration, opposing ends 26 and 27 reside adjacent each other to substantially close the circle. In this manner, each of the bands is readily removable from the sidewall so that other bands carrying different indicia may be substituted therefor.

Referring now in detail to FIG. 5, another embodiment of the present invention is shown wherein the tumbler sidewall 30 carries a plurality of annular bands 31—34 inclusive about the external surface thereof in the same manner as previously described with respect to the embodiment of FIG. 2. However, it is to be noted that in place of the alphabetical characters, numerals are provided on bands 31, 33 and 34 while band 32 carries arithmetic operation symbols. Band 34 carries numerals which are intended to represent the result of a mathematical procedure when carried out using a selected operation symbol from the plurality carried on band 32. In operation, the band 32 is disposed so that a selected operation symbol is between a pair of markers 35 and 36 on the sidewall of the tumbler and then the bands 31 and 33 are moved to place selected numbers carried thereon in vertical alignment with the markers. Next, the band 34 is moved so that the answer to the problem set up in vertical alignment between the markers 35 and 36 resides in alignment therewith.

It is to be noted that the sidewall 30 is modified to the extent that a rib is provided between adjacent ones of the bands so that the bands rest thereon. The ribs are identified by numerals 40, 41 and 42 and are preferably integrally formed with the material of the sidewall. Although the bands shown in FIG. 5 are laid out, it is to be understood that the bands are disposed about the periphery of the circular tumbler 30 and are illustrated in their laid out manner for illustrative purposes.

Referring now to FIG. 6, it is noted that a pair of bands 43 and 44 may be employed, each of which carry pictorial indicia or characters. Either band 43 or 44 may be rotated about the sidewall of the tumbler so as to vertically align similar or identical pictorial subject matter such as the pictures of the "lambs" illustrated on the pair of bands. Dissimilar pictorial subject matter will be aligned with other pictorial subject matter so that the selection is strictly visual to the user. Preferably, bracket-type markers 45 and 46 are carried on the external surface of the sidewall between which the identical pictures carried on the pair of bands are vertically aligned.

In view of the foregoing, it can be seen that the novel educational aid of the present invention provides not only an amusing and interesting game which instructs the user in basic use of letters and mathematical fundamentals, but provides a useful implement of tableware such as a cup or tumbler. Therefore, the invention may be used at mealtimes when the participants are relaxed and in a receptive mood for play. The various bands of the invention carrying suitable indicia may be readily manipulated in accordance with visual corelation of the symbols to solve problems or provide meaningful alignments such as in the spelling of words. The device is low-cost since it is contemplated that plasticlike material will be employed for the tumbler sidewall as well as for the bands per se.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. An educational aid comprising:

an elongated body having a tapered circular sidewall closed at its narrow end and open at its opposite end;

a plurality of indicia carrying bands rotatably carried on the exterior surface of said sidewall midway between its opposite ends;

each of said bands having a different diameter arranged in coaxial stacked relationship with the greater diameter band on top and the others progressively arranged below according to reduced diameters;

said sidewall having a midportion formed with an annular recess for rotatably supporting said plurality of bands in stacked coaxial relationship;

indicator means marked on the exterior surface of said sidewall in vertical alignment and being separated by said plurality of bands;

each of said bands being adapted to rotate about a vertical axis independently from adjacent ones of said bands whereby selected indicia carried on each of said bands is moved into vertical alignment between said indicator means to display meaningful corelation of said selected indicia; and the lowermost one of said stacked bands movably seats against a shoulder formed in said sidewall to define the lower edge marginal region of said recess.

2. The invention as defined in claim 1 including a plurality of spaced apart parallel ribs integrally formed on the exterior surface of said sidewall wherein each of said bands is disposed between adjacent ones of said ribs and wherein said bands are rotatably supported on said ribs.

3. The invention as defined in claim 2 wherein:

each of said bands includes a display area on the external surface thereof; and said indicia includes a plurality of alphabetical characters marked on said display area.

4. The invention as defined in claim 2 wherein:

each of said bands includes a display area on the external surface thereof; and said indicia includes a plurality of numerical characters marked on said display area.

5. The invention as defined in claim 4 wherein a selected one of said bands disposed between two others of said bands includes a plurality of arithmetic symbols marked on said display area.

6. The invention as defined in claim 2 wherein said indicia comprises a plurality of pictorial characters.

7. The invention as defined in claim 1 including:
a handle attached at one end to said sidewall between said bands and the end of said body defining said opening; and
said handle having its opposite end cantilevered away from said sidewall in fixed spaced-apart relationship.

8. The invention as defined in claim 1 wherein each of said bands are composed of a resilient material and each of said bands includes a slot interrupting the continuous continuity of said band to facilitate expandable removal and assembly of each of said bands.